United States Patent [19]

Bliven

[11] 4,451,046

[45] May 29, 1984

[54] APPARATUS FOR SEALING BETWEEN A SHAFT AND HOUSING WITH MULTIPLE LAND MEMBERS AND SEAL MEMBERS

[75] Inventor: David L. Bliven, Connersville, Ind.

[73] Assignee: Dresser Industries, Inc., Dallas, Tex.

[21] Appl. No.: 435,537

[22] Filed: Oct. 20, 1982

[51] Int. Cl.³ .......................... F16J 15/44; F16J 15/46
[52] U.S. Cl. .......................................... 277/3; 277/27; 277/26; 277/30; 277/56
[58] Field of Search .................. 277/1, 26, 53, 27, 28, 277/30, 54–57, 71, 72 R, 79

[56] References Cited

U.S. PATENT DOCUMENTS

| | | |
|---|---|---|
| 1,626,237 | 4/1927 | Hodgkinson . |
| 1,996,780 | 4/1935 | Wheeler . |
| 2,149,524 | 3/1939 | Huhn ...................................... 277/26 |
| 3,071,384 | 1/1963 | Friberg ................................... 277/3 |
| 3,588,125 | 6/1971 | Mastromatteo ........................ 277/26 |
| 3,612,545 | 10/1971 | Storms .................................... 277/26 |
| 3,917,288 | 11/1975 | Huber et al. ......................... 277/56 X |
| 4,290,610 | 9/1981 | Lizogub et al. ........................ 277/13 |

*Primary Examiner*—Robert S. Ward
*Attorney, Agent, or Firm*—Roy L. Van Winkle; John N. Hazelwood

[57] ABSTRACT

The shaft seal includes at least first and second annular land members that are located on the shaft and toward the housing, an annular spacer member positioned on the shaft between the land members, a generally annular seal member frictionally engaging the housing and located between the land members. The arrangement is such that changes in axial dimension of the shaft will cause repositioning of the seal member and thus maintain an effective seal between the shaft and the housing.

4 Claims, 2 Drawing Figures

APPARATUS FOR SEALING BETWEEN A SHAFT AND HOUSING WITH MULTIPLE LAND MEMBERS AND SEAL MEMBERS

BACKGROUND OF THE INVENTION

This invention relates generally to method and apparatus for forming seals between a housing and a shaft having relative rotation therebetween. More particularly, but not by way of limitation, this invention relates to a method for forming a seal between the housing and a shaft and to a seal that is of the labyrinth type.

Labyrinth seals have been known and have been in use for many years. U.S. Pat. No. 1,626,237 issued Apr. 26, 1927 to Francis Hodgkinson illustrates one type of labyrinth seal. In the seal of that patent, the lands of the seal are spaced in progressively different widths to create a throttling effect across the seal and to drop the differential progressively in each of the chambers between seal lands. The spacer members between the lands of this seal are constructed from a relatively soft material so that they can be distorted by tightening, bringing more of the land members into sealing engagement to assure that a fluid-tight seal is maintained. In this seal, rubbing contact is utilized.

Another type of labyrinth seal is illustrated in U.S. Pat. No. 4,290,610 to Lizogub et al. on Sept. 22, 1981. This seal is somewhat similar to the seal illustrated in the '237 patent, but apparently no rubbing occurs between the lands of the seal.

It is also previously known to distribute pressure across the seal to reduce the differential across any sealing element to the desired quantity. Such arrangements are illustrated in the U.S. Pat. No. 1,996,780 issued Apr. 9, 1935 to H. T. Wheeler, and in U.S. Pat. No. 3,071,384 issued Jan. 1, 1963 to J. M. E. Friberg. Although these patents are not of the labyrinth seal type, they do illustrate the utilization of various pressures across the total seal to reduce the differential across any single sealing element.

Labyrinth seals have been successfully used over the years. However, as the housing and shaft, each of which contains part of the seal, are generally constructed from different materials, temperature changes in the machine will cause a different amount of thermal expansion or contraction in the shaft and in the housing. Accordingly, the spacing of the seals, which was done during assembly, may not remain correct. Consequently, extra rubbing between the seal parts or large spaces may occur in the seal which may cause leakage or destruction of the seal.

SUMMARY OF THE INVENTION

An object of this invention is to provide an improved seal system for use between a shaft and housing wherein the sealing element automatically adapts itself to dimensional changes of the shaft and the housing.

Another object of this invention is to provide a method for constructing a seal for use between the housing and the shaft that will automatically compensate for changes in dimensions between the housing and the shaft.

This invention then provides a shaft sealing system for use in apparatus that includes a shaft and a housing, through which the shaft extends and wherein relative rotation occurs between the shaft and the housing.

The system comprises first and second annular land members that are located on the shaft and project toward the housing; an annular spacer member that is positioned on the shaft between the land members; and a generally annular seal member that frictionally engages the housing and is located between and in close proximity to the land members. The movement of the land members, due to axial changes in the shaft, reposition the seal member in the housing to maintain an effective seal between the shaft and the housing.

In another aspect, this invention provides a method for forming a shaft sealing system in apparatus including a housing having a bore therethrough and including a shaft that is relatively rotatable in the bore. The method comprises the steps of pressing the first annular land member on the shaft, positioning an annular spacer member on the shaft abutting the first land member; locating a generally annular seal member in encircling relationship to the spacer member and adjacent to the land member; pressing a second annular land member on the shaft abutting the spacer member; and temporarily reducing the diameter of the seal member while inserting the shaft, land member, spacer member and seal member into the bore until the seal member is located in the desired position.

BRIEF DESCRIPTION OF THE DRAWING

The foregoing and additional objects and advantages of the invention will become more apparent as the following detailed description is read in conjunction with the accompanying drawing, wherein like reference characters denote like parts in all views and wherein.

DETAILED DESCRIPTION OF THE PREFERRED EMBODIMENT

Figure 1:
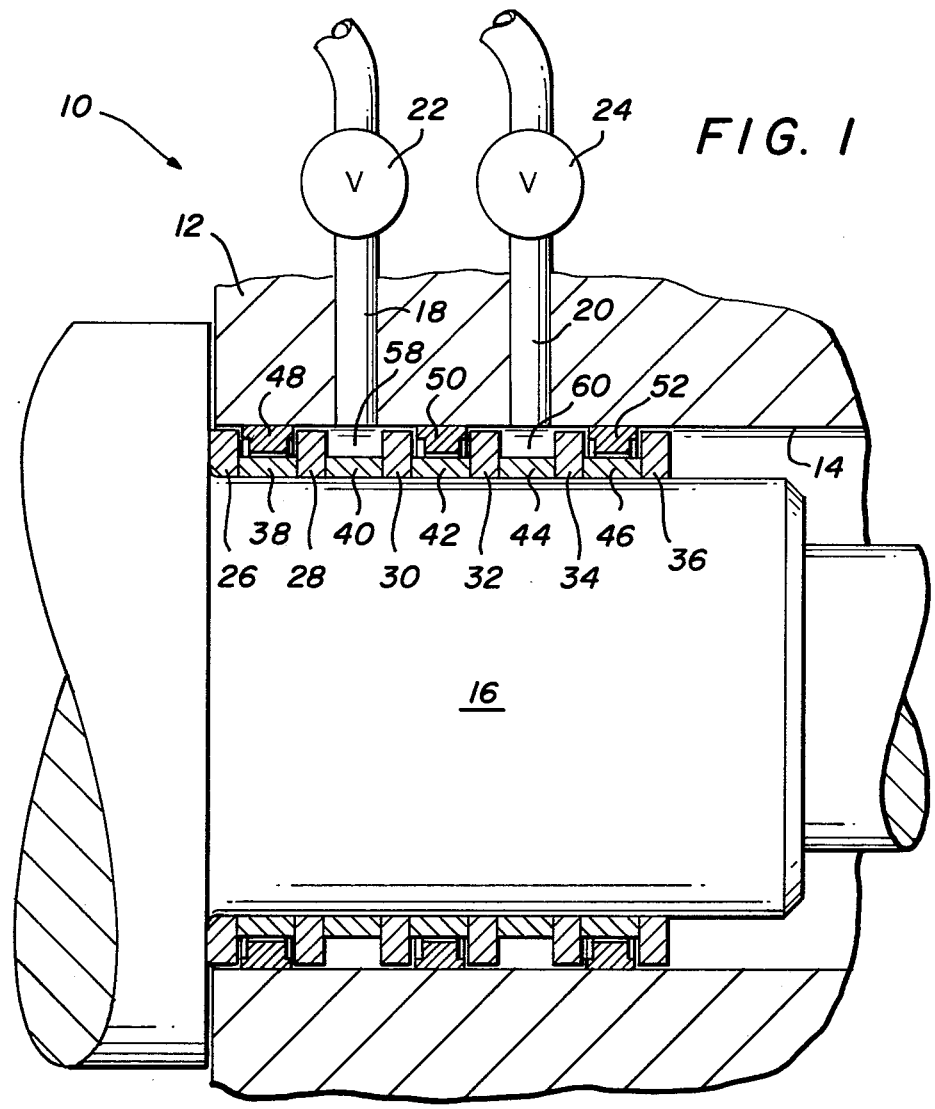
FIG. 1 is a cross-sectional view, partly schematic, illustrating a seal system constructed in accordance with the invention.

Referring to the drawing and to FIG. 1 in particular, shown therein and generally designated by the reference character 10 is a sealing system that is constructed in accordance with the invention. The sealing system 10 is installed in a machine, such as a centrifugal blower or compressor (not shown) that includes a housing 12 having a bore 14 extending therethrough for receiving a shaft 16. The shaft 16 is rotatably supported in the housing 12 by appropriate bearings (not shown). The housing 12, in addition to the bore 14, includes passageways 18 and 20 for purposes that will be described hereinafter.

The sealing system 10 includes control means 22 and 24 that are operably disposed in the passageways 18 and 20, respectively. Each of the control means 22 and 24 may be a device such as a throttling valve, orifice or other more elaborate control that serves the function of controlling the pressure of fluid that is in the passageways 18 and 20. The control means 22 and 24 may be either located within the housing 12 or maybe external thereof, as desired.

The sealing system 10 also includes a plurality of spaced, annular land members 26, 28, 30, 32, 34 and 36. The land members are pressed on the shaft 16 and are held on the shaft in spaced relationship by annular spacer members 38, 40, 42, 44, and 46. In the type of device wherein the shaft 16 is rotating relative to the housing 12, the land members and spacer members rotate with the shaft 16.

The sealing system 10 also includes a plurality of spaced annular seal members 48, 50 and 52 which are not quite as wide as the spacer members to avoid rubbing between the seal and land members. Each of the spacer members and each of the seal members encircle the shaft 16. The seal members 48, 50 and 52 are retained in their respective positions as illustrated in FIG. 1 by frictional engagement of the seal members with the housing 12 in the bore 14.

Figure 2:
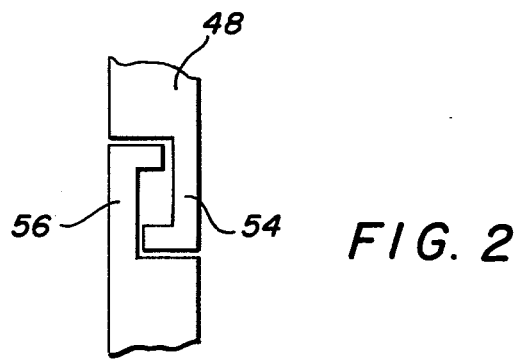
FIG. 2 is an enlarged, partial elevation view illustrating the end portions of one of the sealing rings illustrated in FIG. 1.

The enlarged illustration of FIG. 2, shows end portions 54 and 56 of the seal member 48, which is typical, in greater detail. As shown therein, the end portions 54 and 56 lie in juxtaposition and are slightly spaced apart so that the seal members 48, 50 and 52 can be collapsed for assembly as will be described in more detail.

It will be noted in FIG. 1 that the passageway 18 is disposed so that it communicates with the bore 14 adjacent to a cavity 58 formed between the land members 28 and 30 and adjacent to the spacer member 40. Similarly, the passageway 20 intersects the bore 14 at cavity 60 which is located between the land members 32 and 34 and adjacent to the spacer member 44.

The seal system 10 is assembled on the shaft 16 and in the housing 12 in the following manner: the land member 26 is pressed on the shaft 16 followed by spacer member 38, seal member 48 and land member 28 which is pressed on the shaft 16 until it abuts the spacer member 48. As previously mentioned, the spacer member 38 is slightly wider than the width of the seal member 48, so that the seal member 48 is not in engagement with either of the land members 26 or 28, except inadvertently. As will be apparent, the land members 26 and 28, spacer member 38 and the seal member 58 form one complete sealing unit which could function in the machine if a relatively low differential pressure exists thereacross. The precise number of these "units" needed will depend on the differential to be controlled across the seal system 10. In the illustrated system of FIG. 1, it is assumed that the pressure differential across the entire sealing system 10 will be approximately 120 to 125 psi, thus the pressure drop across any one of the "units" will be about 40 psi. To assure that this is so, the control device 22 is set so that the pressure in the passageway 18 and the pressure in the cavity 58 is about 80 psi.

Returning to the assembly of the sealing system 10, the spacer 40 is placed on the shaft 16 followed by pressed on land member 32, spacer member 42 and seal member 50. Land member 32 is pressed on until it abuts the spacer member 42. It can be seen that the differential in pressure across the seal assembly 10, that is, across two "units" could be divided over the seal members 48 and 50 by regulating the pressure in the passageway 18 to approximately 60 psi and thus, assuring that the drop across each of the seal rings is reduced to approximately 60 psi. However, it is believed that stiffness of the seal members may become a problem if they are constructed to withstand over about 50 psi differential.

The foregoing described assembly procedure is repeated placing the spacer member 44 on the shaft 16, followed by the land member 34 which is pressed thereon, spacer member 46 and seal member 52 with the last land member 36 being pressed on the shaft 16 and into engagement with the spacer member 46. As now assembled, assuming that the pressure across the sealing system 10 will be 120 psi, pressure in the passageway 18 is controlled to about 80 psi assuring a 40 psi drop across the seal member 48. Pressure in the passageway 20 is controlled at about 40 psi, assuring that the pressure drop across the seal member 50 is 40 psi, and since the pressure in the bore outside the land member 36 is 0 psig, the pressure across the seal member 52 is also 40 psi.

To place the shaft 16 with the assembled sealing elements, land members and spacer members thereon into the bore 14, the seal member 52 is temporarily held with its diameter reduced to an amount less than the diameter of the bore 14. The shaft 16 is then inserted into the bore 14 to the point that the seal member 52 is contained within the bore. The seal member 50 is then temporarily reduced in diameter and placed into the bore 14 and subsequently, the seal member 48 is reduced in diameter and placed in the bore 14. As will be appreciated, the seal members 48, 50 and 52 are retained in the bore 14 by friction, and thus, when the shaft 16 is inserted into the bore 14, the land members which have been pressed on the shaft 16, move the seal members into their desired positions. In assemblies where the space is inadequate to hold the seal members 48, 50 and 52, an entering bevel (not shown) may be provided in the bore 14 so that the diameter is reduced by forcing the shaft 16 and seal members into the bore 14.

In the operation of the sealing system 10, which has been described to some extent hereinbefore, the sealing system 10 is assembled as described, and the shaft 16 is driven by a motor (not shown) causing it to rotate in the bore 14. Heat is generated during the compressing operation, thus the shaft 16 tends to elongate. Of course, the housing 12 also changes in dimension, but since the housing 12 and the shaft 16 are generally constructed from different materials, and are of different configuration, the dimensional changes are not of an equal amount. The land members, being pressed on the shaft 16, move with the shaft 16, and thus, are somewhat repositioned by the dimensional changes of the shaft 16. The seal members 48, 50 and 52, being only frictionally retained within the bore 14, move in response to movement of the land members, realigning themselves as necessary to accommodate the dimensional changes in the housing 12 and shaft 16. Thus, a constant efficient seal is assured, even though dimensional changes occur in the machine.

From the foregoing detailed description, it can be seen that the sealing system 10, when constructed in accordance with this invention, provides for the automatic adaptation of the seal to dimensional changes between the shaft and housing whatever may be the cause of such dimensional changes.

Having described but a single embodiment of this invention, it will be apparent that many changes and modifications can be made thereto without departing from the spirit and scope of the invention.

The embodiments of the invention in which an exclusive property or privilege is claimed are defined as follows:

1. A shaft sealing system for use in apparatus including a shaft and a housing, through which the shaft extends, and wherein relative rotation occurs between the shaft and housing, said system comprising:
   first, second, third, fourth, fifth and sixth annular land members located on the shaft and projecting toward the housing;

an annular spacer member positioned on the shaft between each of said first and second, third and fourth, and fifth and sixth land members;

an annular spacing member located on the shaft between said second and third land members and between said fourth and fifth land members;

first, second, and third generally annular seal members frictionally engaging the housing and respectively located between and in close proximity to said first and second, third and fourth, and fifth and sixth land members, respectively; and, means for providing fluid at one pre-selected pressure between said second and third land members and at a different pre-selected pressure between said fourth and fifth land members whereby the pressure differential across each seal member can be controlled.

2. The shaft sealing system of claim 1 wherein each said annular seal member is narrower than the adjacent spacer member.

3. The shaft sealing system of claim 2 wherein each said generally annular seal member has a pair of spaced ends whereby the diameter of said seal members can be reduced to permit insertion into the housing.

4. The sealing system of claim 3 wherein portions of each said sealing member adjacent said ends are disposed in juxtaposition to inhibit the flow of fluid past seal members.

* * * * *